US011466714B2

(12) United States Patent
Arndt et al.

(10) Patent No.: US 11,466,714 B2
(45) Date of Patent: Oct. 11, 2022

(54) FASTENING ARRANGEMENT WITH DAMPING EFFECT AND COMPONENT CONNECTION TO THE FASTENING ARRANGEMENT

(71) Applicant: Böllhoff Verbindungstechnik GmbH, Bielefeld (DE)

(72) Inventors: Andreas Arndt, Kalletal (DE); Thomas Funke, Rietberg (DE); Sandra Steffenfauseweh, Verl (DE); Alexander Vorderwisch, Steinhagen (DE); Dominik Witt, Osnabrück (DE)

(73) Assignee: Böllhoff Verbindungstechnik GmbH, Bielefeld (DE)

( * ) Notice: Subject to any disclaimer, the term of this patent is extended or adjusted under 35 U.S.C. 154(b) by 0 days.

(21) Appl. No.: 17/607,382

(22) PCT Filed: Mar. 31, 2020

(86) PCT No.: PCT/EP2020/059094
§ 371 (c)(1),
(2) Date: Oct. 28, 2021

(87) PCT Pub. No.: WO2020/221537
PCT Pub. Date: Nov. 5, 2020

(65) Prior Publication Data
US 2022/0145918 A1    May 12, 2022

(30) Foreign Application Priority Data
Apr. 29, 2019 (DE) .................... 10 2019 111 078.5

(51) Int. Cl.
*F16B 5/02* (2006.01)
(52) U.S. Cl.
CPC .......... *F16B 5/0241* (2013.01); *F16B 5/0258* (2013.01)

(58) Field of Classification Search
CPC .... F16B 5/0084; F16B 5/0088; F16B 5/0092; F16B 5/0241; F16B 5/025; F16B 5/0258;
(Continued)

(56) References Cited

U.S. PATENT DOCUMENTS 2,212,142 A * 8/1940 Austin .................. F16F 1/3732
267/141.1
4,530,491 A    7/1985 Bucksbee et al.
(Continued)

FOREIGN PATENT DOCUMENTS

CN    1299445 A    6/2001
CN    1680729 A    10/2005
(Continued)

OTHER PUBLICATIONS

English Translation, International Preliminary Report Patentability for PCT Application No. PCT/EP2020/059094 dated Nov. 2, 2021, (7 pages).
(Continued)

*Primary Examiner* — Josh Skroupa
(74) *Attorney, Agent, or Firm* — Reising Ethington P.C.; Matthew J. Schmidt

(57) ABSTRACT

A fastening arrangement with damping effect, consisting of two structurally identical fastening units each having a central first through opening. Each fastening unit comprises a mounting element and a damping element. The mounting element is disc-shaped with a central second through opening and an identical detent structure extends from a first side of each mounting element. The damping element is disc-shaped with a central third through opening and is arranged at last partially in the central second through opening of the mounting element. Due to this construction the two fastening units can be fastened to one another by means of the mutually facing first sides having the identical detent struc-
(Continued)

Figure 1:
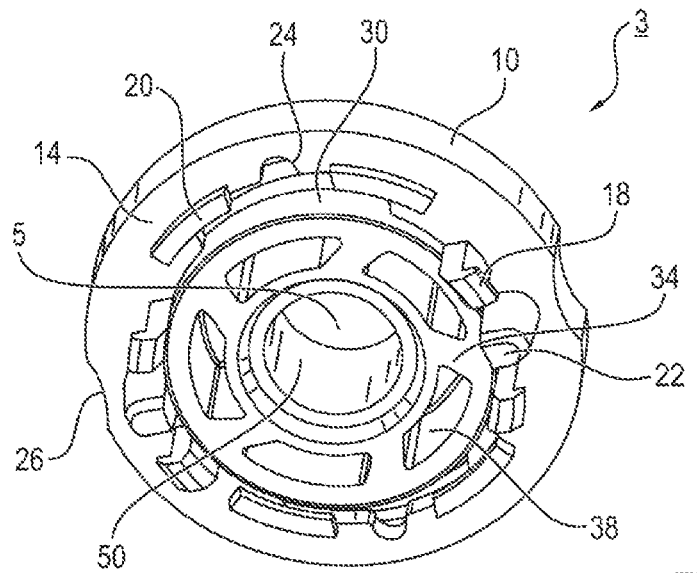

ture of the respective mounting elements with first component arranged between them.

18 Claims, 8 Drawing Sheets

(58) Field of Classification Search
CPC .... F16B 5/10; F16B 7/20; F16B 21/02; F16B 21/04; Y10T 403/54; Y10T 403/7005; Y10T 403/7007; Y10T 403/75
USPC .............................. 403/291, 348, 349, 408.1
See application file for complete search history.

(56) References Cited

U.S. PATENT DOCUMENTS

| | | | |
|---|---|---|---|
| 4,656,689 A | | 4/1987 | Dennis |
| 4,883,319 A | | 11/1989 | Scott |
| 5,537,714 A | | 7/1996 | Lynch, Jr. et al. |
| 5,950,277 A | * | 9/1999 | Tallmadge ............ F16B 5/0258 174/153 G |
| 6,328,513 B1 | * | 12/2001 | Niwa .................... G10K 11/168 411/339 |
| 6,354,578 B1 | * | 3/2002 | Nakatsukasa ......... B60S 1/0444 267/293 |
| 7,217,059 B1 | | 5/2007 | Rudduck |
| 7,237,995 B2 | | 7/2007 | Perez et al. |
| 7,261,365 B2 | * | 8/2007 | Dickson ............... B60G 99/002 296/190.07 |
| 7,273,128 B2 | | 9/2007 | Niwa et al. |
| 7,682,100 B2 | | 3/2010 | Duval |
| 8,409,395 B2 | | 4/2013 | Schumacher, Jr. et al. |
| 9,894,963 B2 | * | 2/2018 | Choi .................. A44B 13/0088 |
| 10,974,665 B2 | | 4/2021 | Heiselbetz |
| 11,131,334 B2 | * | 9/2021 | Glauber ................ F16B 5/0241 |
| 2006/0244188 A1 | | 11/2006 | Johnson et al. |
| 2007/0026735 A1 | | 2/2007 | Pyron et al. |
| 2009/0256028 A1 | | 10/2009 | Vorderwisch et al. |
| 2010/0086377 A1 | | 4/2010 | de Mola |
| 2012/0049425 A1 | | 3/2012 | Willis |
| 2017/0207615 A1 | | 7/2017 | Frapassi et al. |
| 2019/0093697 A1 | | 3/2019 | Becker et al. |

FOREIGN PATENT DOCUMENTS

| | | |
|---|---|---|
| CN | 101087676 A | 12/2007 |
| DE | 19916098 A1 | 10/2000 |
| DE | 602004002062 T2 | 1/2007 |
| DE | 102016106152 A1 | 10/2017 |
| DE | 102017122236 A1 | 3/2019 |
| EP | 2105617 A2 | 9/2009 |

OTHER PUBLICATIONS

Written Opinion & International Search Report for PCT/EP2020/059094 dated Sep. 2, 2020, (11 pages).
CN Office Action for CN Application No. 202080040175.9 dated Aug. 12, 2022 (6 pages).

* cited by examiner

FASTENING ARRANGEMENT WITH DAMPING EFFECT AND COMPONENT CONNECTION TO THE FASTENING ARRANGEMENT

1. TECHNICAL FIELD

The present disclosure is related to a fastening arrangement with damping effect consisting of two identically constructed fastening units with a central first thru-opening each, a fastening unit of the fastening arrangement, a first component with the fastening arrangement, a component connection by means of the fastening arrangement, a production method of a fastening arrangement as well as a connecting method by means of the fastening arrangement.

2. BACKGROUND

Fastening arrangements for the fastening of two components at each other, having a damping effect, are generally known in the state of the art. Such fastening arrangements are generally arranged in a component opening of a first component and secured on both sides of the component opening. A connecting screw which is plugged through the fastening arrangement serves for the fastening of the first component at a second component. For fastening the fastening arrangement in the component opening of the first component, commonly, two differently configured fastening devices are used.

A mounting device for physically connecting a device or an electrical panel to a mounting structure is for example described in US 2012/0049425 A1. The mounting device provides a shock and force isolation. The mounting device comprises an inner and an outer portion mechanically connected via flexible shock absorbing structures. The outer portion of the mounting device mechanically connects to a fastening structure via removable connecting means. A device or electrical panel is attached via mounting means to the center portion of the mounting device.

US 2017/0207615 A1 relates to a cable guide assembly configured to support media cables. The cable guide assembly includes fastening features/structures configured and dimensioned such that they can releasably be assembled with respect to a support structure. Generally, the cable guide assembly offers a smooth surface with a bend relief for fiber or copper cables to pass through the side wall or the panel of an open rack system. The cable guide assembly can include a first and a second guide element that are mounted to one another and to a first side of a side wall of an open rack to form a bisected ring-like structure.

A fastening device for fastening a decoupling device with respect to a hole rim of a hole opening of a shielding part is described in DE 10 2016 106 152 A1. The decoupling device for the vibration decoupling connecting of a sleeve with the shielding part has at least a bridging element which comprises at its radial outer rim connecting means for the fastening connecting of the bridging element with the hole rim of the shielding part. The connecting means include at least four tabs radially protruding from the bridging element to the outside. A subset of at least two tabs of the bridging element is provided to rest against a first outer side of the shielding part and a remainder of at least two tabs is provided to rest against an opposite second outside of the shielding part. The hole rim with the tabs of the subset and the tabs of the remainder can be immobilized in a clamping manner relative to the decoupling device.

DE 60 2004 002 062 T2 describes a vibration proof heat shield. The heat shield is fastened at a vibration source such that it covers at least a part of the heat source. Furthermore, it forms a gap with respect to a surface of said heat source in order to reduce a heat radiation from the heat source. The heat shield includes a vibration proof heat shield main body portion, a collar member, positioned at an open hole of the vibration proof heat shield main body portion and provided with a pair of locking elements, fastened by a bolt at the heat source. Furthermore, it includes a washer member in which a portion interposed between a pair of locking pieces of the collar member is formed with an approximately C-shaped cross section and a joint member joining the washer member and the vibration proof heat shield main body.

A cord connector that both seals automatically and provides strain relief upon wire insertion is described in US 2007/0026735 A1. The cord connector comprises a wire passageway through a pliable shell which seals around both the wire inserted through the passageway as well as the wall opening into which the connector is secured. A more rigid skeleton supports this shell and is provided with appendages which permit the wire to be passed through the passageway, but which block any removal of the wire from the passageway.

EP 2 105 617 A2 describes a two-part fastening arrangement for a surface element being composed of a basic element and a coupling element. The basic element is configured with two sides with a fastening surface at its first side and a connecting stud projecting from its second side, with which a snap connection to the coupling element can be established. The coupling element is also configured with two sides with a fastening surface at its first side and a stud seat for the connecting stud of the basic element at its second side while the coupling element includes an opening in which the stud seat is arranged in a springy manner.

A plastic grommet for use on metal studs in the wall construction protecting wires, cables, conduits and the like is described in U.S. Pat. No. 5,537,714 A. The grommet includes a cylindrical body having an enlarged flange on one end with radially projecting spring snaps on the exterior of the body so that the grommet may be inserted in a hole of the size of the web with the hole edge being captured between the snaps and the flange. On the other side of the flange, there are diametrically opposed axially projecting spring fingers. The flange also includes two diametrically opposed holes, the fingers and holes being positioned so that two grommets can be joined flange-to-flange by axially rotating one with respect to the other.

U.S. Pat. No. 4,656,689 A also relates to a grommet for protecting a conduit which passes through a wall opening, and for providing an air seal between the conduit and the edge of the wall around the wall opening. The grommet has a relatively stiff fastener portion with projections extending therefrom and locking devices at the ends of the projections for engaging the edges of the wall around the wall opening. An elastomeric seal portion receives the projections and has an aperture of smaller dimensions that the outer dimensions of the conduit.

A method for forming a thru-hole through a composite structure having a plurality of internal compartments is described in U.S. Pat. No. 8,409,395 B2. An insert ring is connected to the composite structure to create a protective layer around the periphery of a penetration formed in the composite structure. An adhesive is disposed between the composite structure and the insert ring to create a fluid-tight seal between the insert ring and the inner chambers. In this regard, the fluid-tight seal mitigates the fluid flow between the inner compartments.

Finally, DE 10 2017 122 236 A1 describes a fixing system for fastening a component on a carrier component. The fixing system includes a fixing bolt which can be fitted through a thru-opening of the component and being fixable in a fixing bore of the carrier component as well as an outer sleeve and an inner sleeve which is mounted in an axially movable manner in a through-passage of the outer sleeve, wherein the inner sleeve forms a through-passage for the fixing bolt in which the fixing bolt is mounted in an axially movable manner. Furthermore, the fixing system includes a first spring washer which can be fitted onto the outer sleeve, configured to position itself against a first side of the component in the state when being fixed to the carrier component and a second spring washer which can also be fitted onto the outer sleeve and which is configured to position itself against a second side of the component, said second side being located opposite the first side, in the state when being fixed to the carrier component.

A disadvantage of these known arrangements is the effort of assembly and production as well as the lacking damping effect both for axial as well as radial vibrations or oscillations.

Based on these known fastening arrangements, it is therefore an object of at least some implementations of the present disclosure to provide an improved fastening arrangement with damping effect, which can be fastened without tool and supposed to be used with different material thicknesses. It is also an object of at least some implementations of the present disclosure to provide a facilitated production method for such a fastening arrangement.

3. SUMMARY

The above object is solved by a fastening arrangement with damping effect consisting of two identically constructed fastening units with a central first thru-opening each, a fastening unit of the fastening arrangement, a first component with the fastening arrangement, a component connection by means of the fastening arrangement, a production method of a fastening arrangement according to independent claim 21 as well as a connecting method by means of the fastening. Further embodiments and developments result from the following description, the drawings as well as the appending claims.

A fastening arrangement with damping effect consists of two identically constructed fastening units with a central first thru-opening each. Each fastening unit includes an assembly element and a damping element. The assembly element is formed disk-like with a central second thru-opening and an identical latching structure extends from a first side of each assembly element. The damping element is formed disk-like with a central third thru-opening and is arranged at least partly in the central second thru-opening of the assembly element. The two fastening units are fastenable at each other via the first sides, facing each other, with the identical latching structure of the respective assembly elements with first component being interposed.

In the following, the use of the fastening arrangement is described for the better understanding of the disclosure. In this context, a main feature is that the fastening arrangement is comprised of two identically constructed fastening units. This is also reflected by the fact that the latching structures on the first side of each assembly element are configured identically. For the positional orientation, a longitudinal axis of the fastening arrangement is defined by the first thru-opening of the identically constructed fastening units. In other words, an insertion direction of a connecting element, e.g., a connecting screw or a bolt, extends through the first thru-openings of the identically constructed fastening units along the longitudinal axis of the fastening arrangement and thus of each fastening unit, too.

In use, firstly, the two identically constructed fastening units are provided which are intended to be fastened in an opening of a first component, e.g., in an opening in an assembly flange of a vibration-generating pump. An exemplary component thickness of the first component in the portion of the opening lies between 1 and 3 mm. In a first step, one of the fastening units is arranged in the opening of the first component. In this context, the dimensioning of the opening in the first component is such that the latching structure which may extend adjacent to the second thru-opening from the first side of the assembly element, extends into the opening in the first component. In turn, an outer diameter of the assembly element is chosen big enough that the assembly element abuts the first component adjacent to the first opening. The abutment surface which is configured by that defines an abutment plane at the first component which is aligned rectangularly with respect to the longitudinal axis of the fastening arrangement. In one configuration, the abutment surface is configured continuously. In an alternative configuration, the abutment surface is configured partially, e.g., with breakthroughs or the like.

Once one of the two identically constructed fastening units has been arranged at the first component side with latching structure extending into the opening in the first component, the other of the two fastening units is analogously arranged on the opposite second component side. As both fastening units are identically constructed and are inserted into the component opening of the first component with first sides of the assembly element facing one another, namely with the identical latching structures facing one another, the fastening units must be rotated with respect to one another by an angle around the longitudinal axis of the fastening arrangement. In this way, the identical latching structures of the respective assembly elements of the corresponding fastening units engage with each other in the portion of the opening of the first component, while the first component may be arranged adjacent to the opening in the first component between the fastening units and between the assembly elements. This construction becomes clear later, with respect to the further embodiments.

After the pre-assembly of the fastening arrangement which has taken place in this manner, a second component is provided. This takes place at the same production location or at another production location, depending on the desired course of the procedure. This is also explained in detail later.

An opening of the second component is aligned with the central first thru-openings of the fastening units. Subsequently, a connecting element, as for example a connecting screw or a bolt, is guided through the central first thru-opening and fastened in a fastening portion which is provided in or adjacent to the second component. In this context, the fastening takes place in a way that a compression of the respective damping element of the fastening units provides a damping effect both for axial as well as radial vibrations or oscillations. Here, it should be considered that beside the assembly function, the assembly element also provides a protective function for the damping element, which may be against abrasive wear. In this context, a choice of material for the damping element must be made so that on the one hand, a sufficient damping effect is provided while on the other hand, a necessary connection stability is guaranteed at the same time. For this purpose, a thermoplastic elastomer may be suitable.

An advantage of this approach is that the production effort is reduced due to the use of identically constructed fastening units. In addition, a worker does not have to pay attention to a correct assignment of the fastening units during the assembly. Therefore, the danger of a faulty assembly is reduced, too. Furthermore, an automated installation is simplified as the fastening units must only be rotated around the longitudinal axis relative to each other so that the identical latching structures can be brought into engagement with each other.

In a further embodiment of the fastening arrangement with damping effect, the latching structure extends rectangularly with respect to the abutment surface, that may be defined by the disc form of the assembly element, at the first component. In this context, the latching structure may be arranged adjacent to the central second thru-opening. In this manner, the mutual engagement of the latching structures of the assembly elements may be guaranteed effectively in case of an assembled fastening arrangement. With regard to the disc form of the assembly element, the portion adjacent to the central second thru-opening can therefore also be considered as assembly portion and the portion which lies radially further outside on the first side can be considered as abutment portion at the first component. Thus, on the one hand, the assembly element ensures that the respective fastening unit does not fit through the opening in the first component as a whole but is in contact with the edge portion of the opening. On the other hand, a safe assembly of the fastening arrangement in the component opening of the first component takes place via the identical latching structures of the two assembly elements of the two fastening units at each other, alone.

Each fastening unit furthermore may include a sleeve which is arranged in the central third through opening of the damping element. In this way, a material selection for the damping element can be aligned more to the damping effect as the stability of the fastening unit which is reduced by that can be compensated by the stabilizing effect of the sleeve. The sleeve may be made of metal or a thermoplastic material. In the state of use of the fastening arrangement, the sleeves of the respective fastening units may contact each other. An advantage of this construction becomes clear later.

In a further embodiment of the fastening arrangement, the sleeve may be arranged by means of a press-fit in the central third thru-opening of the damping element. This may be realized by the fact that an outer diameter of the sleeve may be larger than an inner diameter of the central third thru-opening of the damping element. In this way, it is guaranteed that the components assembly element, damping element and sleeve of the respective fastening unit are fastened at each other in a loss-proof manner. The processing of the respective fastening units is thus facilitated, and an automated processing may be supported. Alternatively to that, ribs are provided at the radial inner side of the damping element, so that the sleeve is partially clamped.

Advantageously, each damping element has a shore A hardness between 40 and 80 shore A and/or a plurality of recesses on a first side, wherein the latching structure of the assembly element and the recesses of the associated damping element are provided on the same side of the respective fastening unit. This configuration may lead to the damping element having damping properties which are adapted to the respective application field. The fastening units of the fastening arrangement may be therefore adaptable to the desired application field.

It is furthermore advantageous that each assembly element includes a plurality of latching noses as latching structure, which engage with a corresponding plurality of latching surfaces at the assembly element in the assembled state of the fastening arrangement. The respective latching surfaces can be provided by separate portions which provide an undercut in the assembly direction of the assembly elements at each other. Alternatively, the latching noses of the one assembly element provide latching surfaces for the other assembly element. Both alternatives are explained in the following.

According to a first alternative of a further embodiment, the latching noses may be oriented to the radial outside. Each assembly element may include four latching noses directed to the outside and four latching surfaces separated from that, each being grouped as two and arranged on radially opposite sides. In other words, two latching noses each are arranged directly adjacent to each other and are thus forming a pair of latching noses. The first pair of latching noses is arranged radially on the opposite side with regard to the second pair of latching noses. In other words, the geometric center of a pair of latching noses is spaced from the geometric center of the other pair of latching noses by 180°. This arrangement applies analogously to the latching surfaces. As the latching nose pairs are arranged in alternation with the latching surfaces, a geometric center of a latching nose pair is spaced by 90° from the geometric center of a pair of latching surfaces. A fastening of the fastening units at each other therefore may take place by rotating the assembly elements of the two identically constructed fastening units relative to each other by 90° around the longitudinal axis of the fastening arrangement and by subsequently moving them towards each other along the longitudinal axis until the latching noses lock with the latching surfaces. The number of latching noses which are grouped in this manner may depend on the diameter of the assembly element, the number of grouped latching noses may also increase with an increasing diameter. In this context, the grouped latching noses may be spaced from each other evenly, so that the angle between the respective pairs of latching noses or groups of latching noses is the same.

In a further embodiment, each assembly element may include two guiding webs and two recesses on the radial inside, each being arranged radially opposite to one another and in alternation. A guiding web may be centrally arranged between a pair of latching noses. Consequently, the recess for the respective guiding web is arranged in the middle between a pair of latching noses, offset to it by 90°. The assembly is further simplified by means of the guiding webs and the associated recesses and an anti-twist protection is formed so that two assembly elements cannot or can only slightly be rotated relatively to each other in the state where they are fastened at each other.

Furthermore, it is advantageous in this alternative that each assembly element includes two depressions on the radial outside. By means of the depression which is arranged radially outwardly, the alignment of the assembly elements to one another can be recognized easily, which supports the assembly by the worker on the one hand as well as an automated processing.

According to a second embodiment, the latching noses of each assembly element may be aligned or arranged on a joint circle line and adjacent latching noses show in opposite directions along the circle line. In other words, the latching noses are arranged such that the latching projections do not show radially outwardly or inwardly. Rather, two latching noses, which face each other with the back, i.e., the side opposite to the latching projection, form a pair of latching noses. For example, six such latching nose pairs are present which are spaced from each other evenly. Due to this construction, the latching projections of the latching noses of the one assembly element also form the latching surfaces for the latching projections of the latching noses of the other assembly element. With regard to the example with the six latching nose pairs, two assembly elements must be rotated relatively with respect to each other by 30° around the longitudinal axis of the fastening arrangement for the assembly of the assembly elements before they can be moved towards each other along the longitudinal axis for the latching. The assembly elements of each fastening unit may be rotated with respect to each other by 30° around the longitudinal axis for the purpose of being fastened at each other. Thus, the latching nose of a latching nose pair of an assembly element engages with a latching nose of a latching nose pair of the other assembly element. The other latching nose of the latching nose pair of the assembly element engages with a latching nose of an adjacent latching nose pair of the other assembly element. This arrangement may provide a reliable fastening of the assembly elements to one another.

In a further embodiment, each assembly element may include a recess between each group of latching noses at the radial outside, in which a corresponding first projection of the damping element is arranged. The first projections which may be arranged radially outside and on the first side of the damping element provide an orientation aid for the assembly of the fastening units at each other.

In the embodiment according to the second alternative, each damping element may include a plurality of second projections in accordance with a pair of latching noses at the first side radially inwardly. This construction provides a further anti-twist protection of the fastening units to each other and facilitate the correct assembly.

In an embodiment of the second alternative, the sleeve of each fastening unit may be configured two-part. Due to this construction, the damping features of the respective fastening unit is further improved. Alternatively to that, the sleeve is provided with a plurality of breakthroughs through which the material of the damping element radially projects to the inside. In this way, the inner diameter of the fastening unit is reduced at this location, whereby the fastening element is arrangeable in there in a loss-proof manner.

A fastening unit of a fastening arrangement with a central first thru-opening includes an assembly element as well as a damping element. The assembly element is configured in the form of a washer or disc with a central second thru-opening and a latching structure extends from a first side of the assembly element. The damping element is configured in the form of a disc with a central third thru-opening and arranged at least partly in the central second thru-opening of the assembly element. Two identically constructed fastening units therefore lead to the fastening arrangement. Therefore, reference is made to the above explanations with regard to the resulting advantages.

In a further embodiment of the fastening unit, it furthermore includes a sleeve which may be arranged in the central third thru-opening of the damping element. Regarding this embodiment, too, reference may be made to the corresponding explanations with respect to the fastening arrangement.

A first component comprises a fastening arrangement which is arranged in a component opening of the first component. The first component is for example a pump, such as a vacuum pump, with the fastening arrangement being pre-assembled in an opening of an assembly flange. A material thickness of the first component adjacent to the component opening may lie between 1 and 3 mm. With regard to the resulting technical effects and advantages, reference is again made to the above explanations.

A component connection includes a first component as well as a second component with a second opening and a connecting element, wherein the connecting element extends through the fastening arrangement and engages with a suitable fastening portion in or adjacent to the second component. This construction clearly shows that a releasable fastening, as for example a screwing, is implementable with the fastening arrangement, wherein in an embodiment, the sleeves of the fastening units abut one another in the tightly connected state of the two components, so that a block screwing may be implementable. Consequently, a length or axial extension of the sleeves in the longitudinal direction of the fastening arrangement may be less than an axial extension of the damping elements in longitudinal direction of the fastening arrangement. With regard to the component connection, too, reference is made to the above explanations regarding the fastening arrangement.

In a further embodiment of the component connection, a radial tolerance compensation may be implementable during the establishing of the component connection in that each damping element, each sleeve, may have an inner diameter that is larger than the outer diameter of the connecting element. This may simplify the fastening of the two components at each other, be it by a worker or automatically.

A production method of a fastening arrangement includes the steps: providing an assembly element, providing a damping element, arranging the damping element at least partly in the assembly element and repeating the steps of the providing of an assembly element, of the providing of a damping element and of the arranging of the damping element at least partly in the assembly element in order to provide a further identically constructed fastening unit, the assembly element of which has an identical latching structure, so that two identically constructed fastening units of the fastening arrangement are fastenable at each other by arranging the first sides of the respective assembly elements in a way that they face one another, with a first component arranged between them. As can be recognized based on the above steps, the fastening arrangement is provided with the production method. In order to avoid repetitions, reference is therefore made to the above explanations regarding the fastening arrangement.

In a further embodiment of the production method, the same may include the further step of the providing of a sleeve and the arranging of the sleeve in the damping element. As regards to this embodiment, reference is again made to the above discussion of the correspondingly configured fastening arrangement.

In a further embodiment of the production method, the sleeve may be made of a metal or a thermoplastic and/or the assembly element may be made of a technical thermoplastic. The sleeve may be made of an electrically conductive material, which may be of an electrically conductive thermoplastic with or without fiber reinforcement. The fastening arrangement is adapted to the desired application field with the choice of the respective material. In this context, the assembly element also fulfils a protective function, for the damping element arranged at least partly in there, by providing a protection against abrasive wear beside the assembly function.

In a further embodiment of the production method, the providing of the assembly element may take place by injection molding the assembly element and/or the providing of the damping element may take place by arranging the sleeve in the assembly element and injection-molding the damping element out of a material with a shore A hardness between 40 and 80 shore A. Different production methods are covered by this approach. On the one hand, the assembly element and the damping element can be injection-molded separately from one another and then be inserted into one another. In this context, the sleeve may be already inserted into the damping element or is overmolded when the damping element is injection molded. In this context, the damping element may be produced by means of vulcanization instead of injection-molding. Alternatively, firstly, the assembly element is produced by means of injection-molding. Then, the sleeve is inserted into the produced assembly element, both components are arranged in a further injection mold and the damping element is produced by means of injection molding. In doing so, the damping element is produced directly at the correct position in the assembly element by means of injection-molding, so that the separate arranging of the damping element in the assembly element is obsolete. The production method is further simplified by that. In this context, it is advantageous when the sleeve may include a plurality of breakthroughs. In this way, the fastening element can be arranged in a loss-proof manner in one of the two fastening units which form the fastening arrangement, as is explained above.

A connecting method of a first component with a second component includes the steps: providing a first component with a fastening arrangement arranged in there, a first component, or providing a first component and a fastening arrangement as well as arranging the fastening arrangement in an opening of the first component, subsequently, arranging a second component with a second component opening in alignment with the first component opening and inserting the connecting element, so that the outer thread of the connecting element engages with a suitable fastening portion in or adjacent to the second component. The component connection is thus establishable with the connecting method. With regard to the arising technical effects and advantages, reference is therefore made to the above descriptions.

4. BRIEF DESCRIPTION OF THE DRAWINGS

Figure 4:
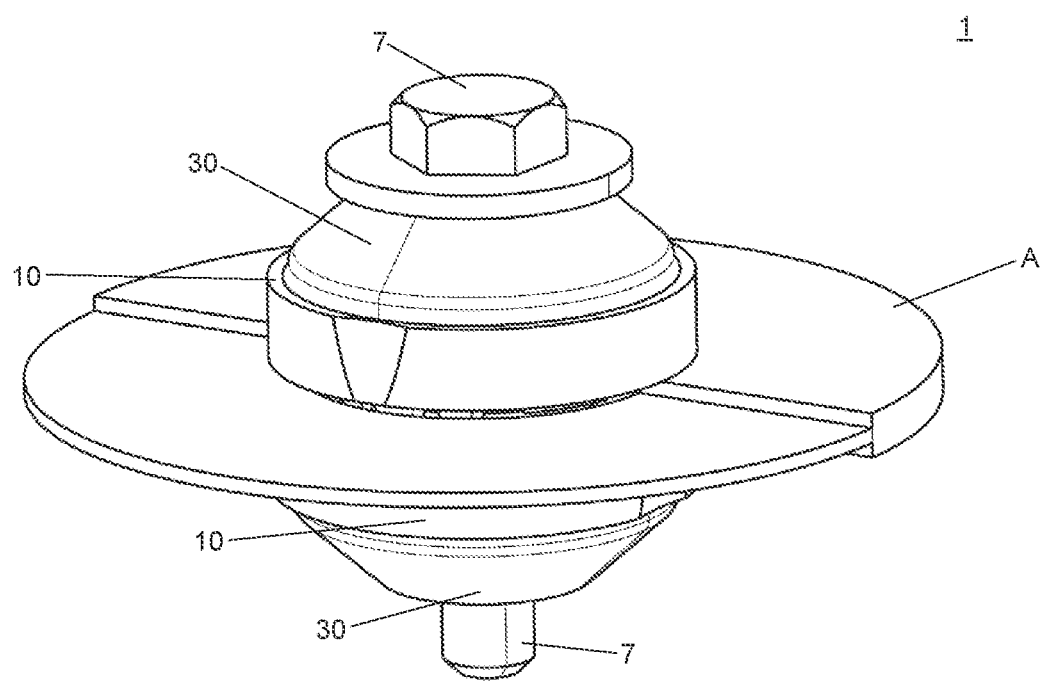
Figure 5:
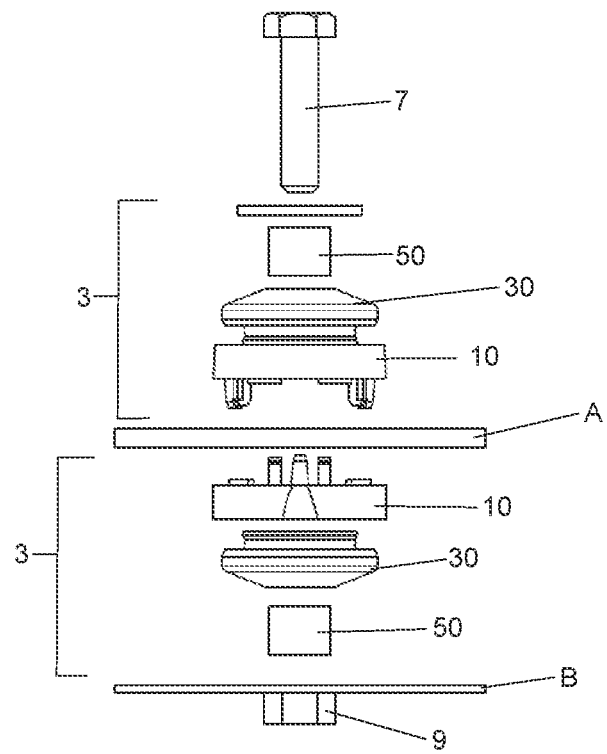
Figure 6:
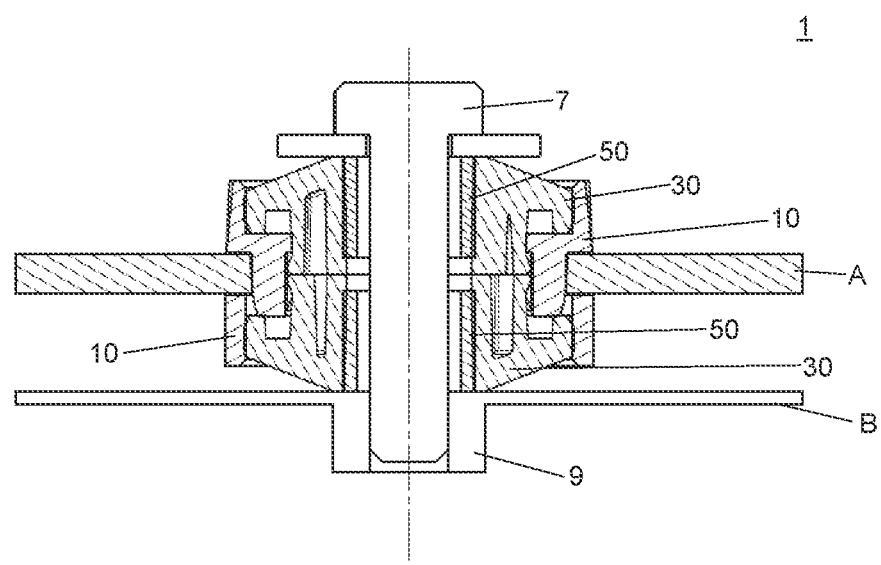
Figure 7:
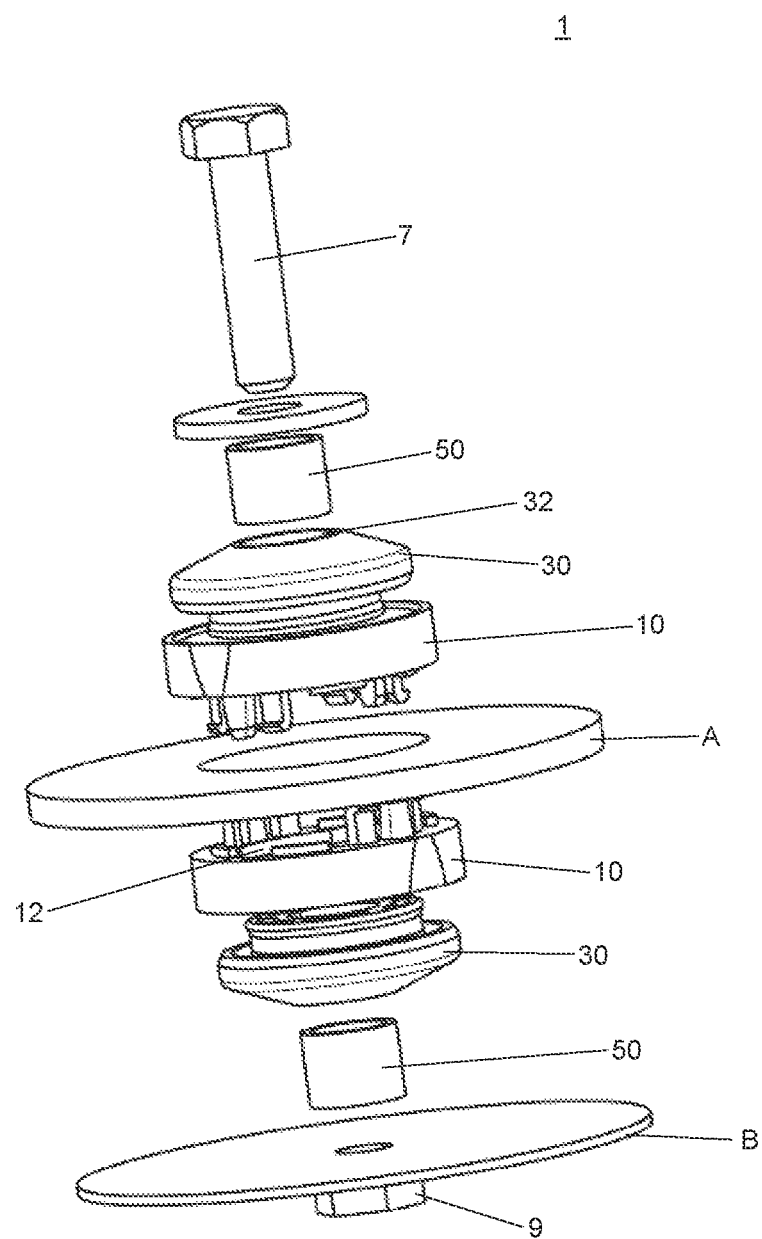

In the following, the present disclosure will be described in detail based on the drawings. In the drawings, the same reference signs denote the same elements and/or components. It shows:

FIG. 1 a first perspective view of a first embodiment of a fastening unit of a fastening arrangement from below, FIG. 2 a second perspective view of the first embodiment of the fastening unit of the fastening arrangement from below, FIG. 3 a third perspective view of the first embodiment of the fastening unit of the fastening arrangement from above, FIG. 4 a perspective view of the first embodiment of the fastening arrangement from the side in a component connection with different plate thicknesses, FIG. 5 a lateral exploded view of the first embodiment of the fastening arrangement in a component connection, FIG. 6 a sectional view of the first embodiment of the fastening arrangement in a component connection, FIG. 7 a perspective exploded view of the first embodiment of the fastening arrangement in a component connection, FIG. 8 a lateral exploded view of a second embodiment of the fastening arrangement in a component connection, FIG. 9 a first perspective view of a second embodiment of a fastening unit of the fastening arrangement from below, FIG. 10 a second perspective view of the second embodiment of the fastening unit of the fastening arrangement from below, FIG. 11 a schematic course of procedure of a first embodiment of a production method of the fastening arrangement, FIG. 12 a schematic course of procedure of a second embodiment of a production method of the fastening arrangement, and FIG. 13 a schematic course of procedure of an embodiment of a connecting method with the fastening arrangement.

5. DETAILED DESCRIPTION

Figure 2:
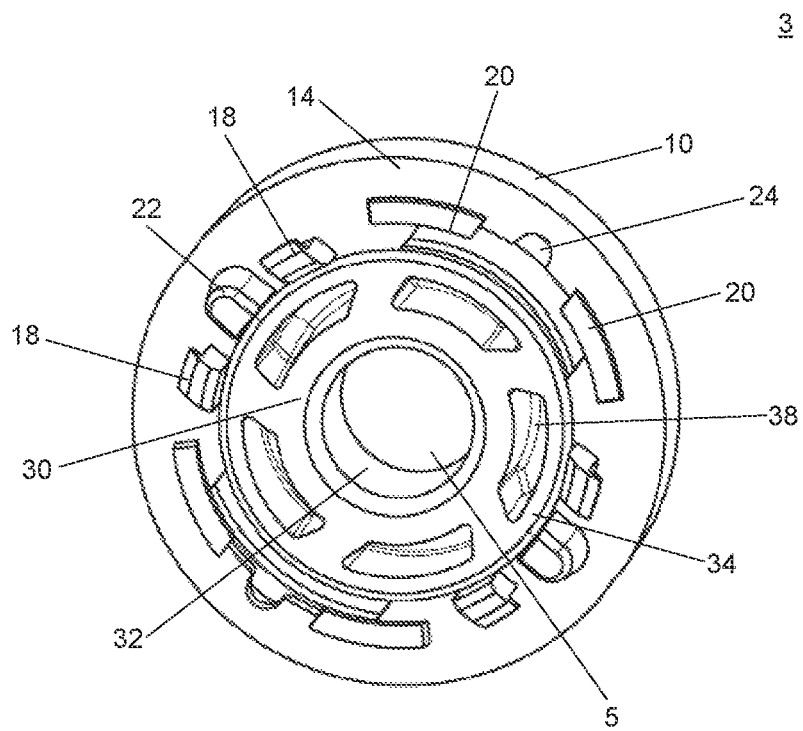
Figure 3:
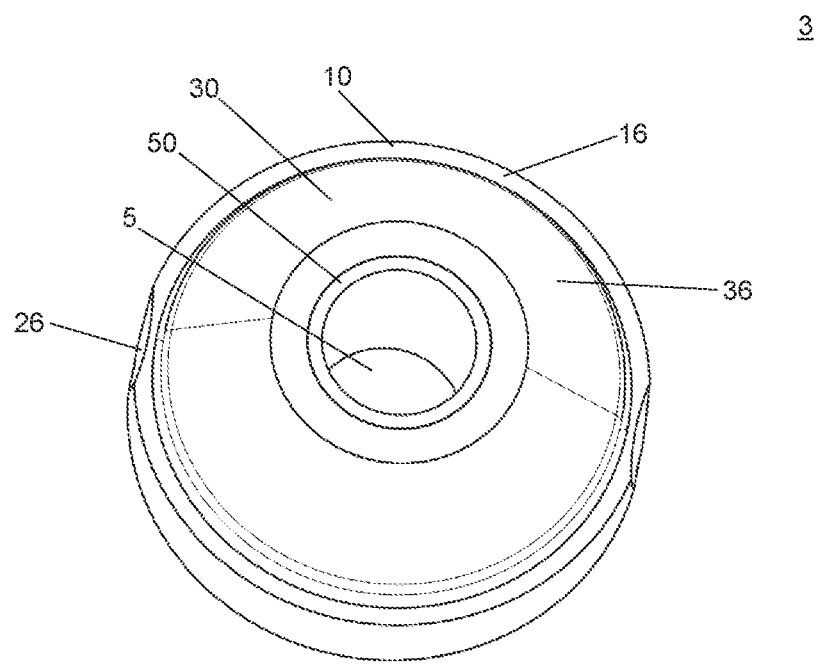

With reference to FIGS. 1 to 3, firstly, a first embodiment of a fastening unit 3 is explained. Generally, it is to be pointed out that two identically constructed fastening units 3 according to this first embodiment form a first embodiment of a fastening arrangement 1 with damping effect.

The fastening unit 3 includes a central first thru-opening 5 and generally comprises an assembly element 10, a damping element 30 and a sleeve 50. As material for the sleeve 50, a metal or a thermoplastic is used. The material may be an electrically conductive material, e.g., a thermoplastic material with electrically conductive features as well as with or without fiber reinforcement. As the sleeves 50 of the two fastening units 3 which form the fastening arrangement 1 abut one another in the later use, the choice of material is made so that the sleeves 50 can absorb the arising forces and transmit them. The assembly element 10 may be made of a technical thermoplastic, as for example a polyamide. Beside the fastening function which becomes clear later, it provides a protective function for the damping element 30 against abrasive wear. The damping element 30 in turn provides the damping function of the fastening arrangement 1 and is made of an elastomer or a thermoplastic elastomer having a shore A hardness of between 40 and 80 shore A. The fastening unit 3 and thus the fastening arrangement 1 as a whole can be adapted to the desired application field by means of the corresponding choice of material. Possible application fields lie within a temperature range of between −40° C. and 200° C.

The assembly element 10 is configured in the form of a disc having a central second thru-opening 12. Due to the disc form, the assembly element 10 has a first side 14 and an opposite second side 16. A locking structure extends from the first side 14 of the assembly element 10, which, in use, at least partly abuts the first component A adjacent to an opening in the first component A. With reference to the disc form of the assembly element 10, the portion adjacent to the central second thru-opening 12 is an assembly portion and the portion which lies radially further outside on the first side 14 acts as an abutment portion at the first component. Thus, in use, the assembly element 10 guarantees on the one hand that the respective fastening unit 3 does not fit through the opening in the first component A but is in contact with the edge portion of the opening. On the other hand, a safe assembly of the fastening arrangement 1 in the component opening of the first component A takes place by means of the identical latching structures of the two assembly elements 10 of the two fastening units 3 at each other alone.

In the illustrated example, the latching structure is made of a plurality of latching noses 18 which engage with a corresponding plurality of latching surfaces 20 at the identically constructed assembly element 10 in the assembled state of the fastening arrangement 1. In the illustrated example, the latching structure is formed by four latching noses 18 as well as four latching surfaces 20, with the latching surfaces 20 being provided by separate portions which provide an undercut in the assembly direction of the identically constructed assembly elements 10 at one another. This becomes clear later in the discussion of the use or assembly of the fastening arrangement 1 with the two identically constructed fastening units 3.

The latching structure extends rectangularly to the abutment plane, defined by the disc form of the assembly element 10, at the first component A. Furthermore, the latching structure is arranged adjacent to the central second thru-opening 12. As is explained in detail later, the mutual engagement of the latching structures of the assembly elements 10 in case of an assembled fastening arrangement 1 may be thereby guaranteed effectively.

According to the illustrated embodiment, the latching noses 18 are directed to the radial outside. These four latching noses 18, which are directed to the radial outside, and the four latching surfaces 20 separated from them, are grouped in twos and are arranged at radially opposite sides. In other words, two latching noses 18 each are arranged directly adjacent to each other and from a pair of latching noses in this way. The first pair of latching noses 18 is arranged radially on the opposite side with regard to the second pair of latching noses 18. The geometric center of a latching nose pair is therefore spaced by 180° from the geometric center of the other latching nose pair. This arrangement analogously applies to the latching surfaces 20. As the latching nose pairs are arranged in alternation with the latching surface pairs, a geometric center of a latching nose pair is spaced by 90° from the geometric center of a pair of latching surfaces 20. A fastening of the identically constructed fastening units 3 at each other takes place by rotating the assembly elements 10 of each fastening unit 3 relatively to one another by 90° around the longitudinal axis of the fastening arrangement 1.

Furthermore, the assembly element 10 includes two guiding webs 22 and two recesses 24 on the radial inner side which are arranged so that they face each other radially and in an alternating way. In this context, a guiding web 22 is arranged centrally between a pair of latching noses 18. Consequently, the recess 24 for the respective guiding web 22 is arranged offset by 90° to that centrally between a pair of latching surfaces 20. By means of the guiding webs 22 and the associated recesses 24, an anti-twist protection is formed so that two assembly elements 10 cannot be rotated in the state when being fastened at each other or only slightly relative to each other.

Finally, each assembly element 10 includes two recesses 26 at the radial outside. In the illustrated example, the positions of the recesses 26 lie on one line with the positions of the guiding webs 22. In this manner, the orientation of the assembly elements 10 with respect to each other can be recognized easily, which supports the assembly by the worker on the one hand as well as an automated processing.

The damping element 30 is formed disc-like with a central third thru-opening 32. Also the damping element 30 includes a first side 34 which in use is arranged adjacent to the first component A, as well as an opposite second side 36. The damping element 30 is arranged at least partly in the central second thru-opening 12 of the assembly element 10.

In the illustrated embodiment, the damping element 30 includes a plurality of recesses 38 at the first side 34. Thus, the latching structure of the assembly element 10 and the recesses 38 of the damping element 30 are provided on the same side of the respective fastening unit 3. A corresponding design of the recesses 38, which may be in connection with the choice of material for the damping element 30, causes the damping element 30 having damping properties which are adapted to the respective application field. The second side 36 of the damping element 30 is configured closed, apart from the central third thru-opening 32. In the illustrated embodiment, the second side 36 is configured convex. The second side 36 of the damping element 30 may be configured conically or in a truncated form. Furthermore, the damping element 30 as a whole can be configured conically or in the form of a truncated cone.

The sleeve 50 as third component of the fastening unit 3 is arranged in the central third thru-opening 32 of the damping element 30. The arranging of the sleeve 30 in the third thru-opening 32 may take place by means of a press-fit. This is implemented by the fact that an outer diameter of the sleeve 50 is larger than an inner diameter of the central third thru-opening 32 of the damping element 30. In this way, it is guaranteed that the components assembly element 10, damping element 30 and sleeve 50 of the fastening unit 3 are fastened at each other in a loss-proof manner. This facilitates the processing of the respective fastening unit 3 and allows an automated processing, too. Furthermore, an axial extension of the sleeve 50 in the longitudinal direction of the fastening arrangement 1 is less than an axial extension of the damping element 30 in the longitudinal direction of the fastening arrangement 1. In this way, a compression of the damping element 30 in longitudinal direction of the fastening arrangement 1 is implementable in case of a later block screwing where the sleeves of the identically constructed fastening units 3 abut one another.

Two identically constructed fastening units 3 form a fastening arrangement 1. Due to the identical construction, the latching structures on the first side 14 of each assembly element 10 are configured identically. A longitudinal axis of the fastening arrangement 1 is there defined by the first thru-openings 5. In other words, an insertion direction of a connecting screw 7, as an exemplary connecting element, extends through the thru-opening 5 along the longitudinal axis of the fastening arrangement 1 and thus of each fastening unit 3, too. The assembly and the corresponding functionality are explained in the following with reference to FIGS. 4 to 7.

In use, firstly, two identically constructed fastening units 3 are provided which are intended to be fastened in an opening of a first component A, e.g., an assembly flange of a vibration-generating pump. A material thickness of the first component adjacent to the component opening may lie between 1 and 3 mm. In a first step, one of the fastening units 3 is arranged adjacent to the opening of the first component A. Here, the dimensioning of the opening in the first component A is such that the latching structure extends into the opening in the first component A. In the present example, the latching noses 18 as well as the guiding webs 22 therefore extend into the opening in the first component A.

In turn, the outer diameter of the assembly element 10 is chosen so that the assembly element 10 abuts the first component A adjacent to the first opening. The abutment surface which has been formed by that defines an abutment plane at the first component A, which is rectangular with regard to the longitudinal axis of the fastening arrangement 1.

Once one of the two identically constructed fastening units 3 with latching structure extending into the opening in the first component A has been arranged at a first component side, the other of the two identically constructed fastening units 3 is analogously arranged on an opposite second component side. As both fastening units 3 are formed with an identical construction and are inserted into the component opening of the first component A with first sides of the assembly element 10 facing one another, i.e., with the identical latching structures facing one another, the fastening units 3 must be rotated with respect to each other by an angle around the longitudinal axis of the fastening arrangement 1. In the illustrated example, a relative rotation by 90° of the two fastening units 3 to one another is necessary. In this position, the latching noses 18 of the assembly element 10 of one of the fastening units 3 engage with the latching surfaces 20 of the assembly element 10 of the other fastening unit 3, when the fastening units 3 are moved along the longitudinal axis towards each other. Furthermore, the guiding webs 22 of the assembly element 10 of one of the fastening units engage into the recess 24, provided for this purpose, at the assembly element 10 of the other fastening unit. In this way, the identical latching structures of the respective assembly elements 10 of the corresponding fastening units 3 engage with each other while the first component A may be arranged between the fastening units 3 and between the assembly elements 10.

After the preassembly of the fastening arrangement 1 which has been carried out in this way, a second component B is provided. This takes place at the same production location or at another production location, depending on the desired course of procedure.

An opening of the second component B is aligned with the central first thru-opening 5 of the fastening units 3. Subsequently, a connecting screw 7, as connecting element, is passed through the central first thru-openings 5 and brought into engagement with a fastening portion 9 for the connecting screw 7, the fastening portion 9 for example having an inner thread or being provided in or adjacent to the second component B. A radial tolerance compensation is realized by the fact that each sleeve 50 has an inner diameter which is larger than the outer diameter of the connecting screw 7. This may simplify the fastening of the two components A, B at one another, be it by a worker or automatically.

An exemplary screwing takes place so that the sleeves 50 of the respective fastening units 3 abut one another (not illustrated) and a compression of the respective damping element of the fastening unit 3 provides a damping effect both for axial as well as radial vibrations. In this context, it should be considered that the assembly element 10, as explained in the beginning, also provides a protective function for the damping element 30 beside the assembly function, which may be a protection against abrasive wear. This construction clearly shows that with the fastening arrangement 1, a releasable screwing may be realized, wherein the sleeves 50 of the fastening unit 3 abut each other in case of the tightly connected state of the two components A, B, so that a block screwing may be present.

An advantage of this approach is that the effort of production is reduced due to the use of two identically constructed fastening units 3. Furthermore, a worker does not have to pay attention to a correct assignment of the fastening units 3 during the assembly. Therefore, the danger of a faulty assembly is reduced, too. Furthermore, the possibility of the automated installation is provided as the fastening units 3 only have to be rotated relative to each other around the longitudinal axis so that the identical latching structures can subsequently be brought into engagement with each other. As a result, the two fastening units 3 are thus fastenable at each other via the first sides 14, facing each other, with the identical latching structure of the respective assembly elements 10 with first component A being arranged between them. In this state, a first component A with a preassembled fastening arrangement 1 in a component opening of the first component A is thus present.

Figure 8:
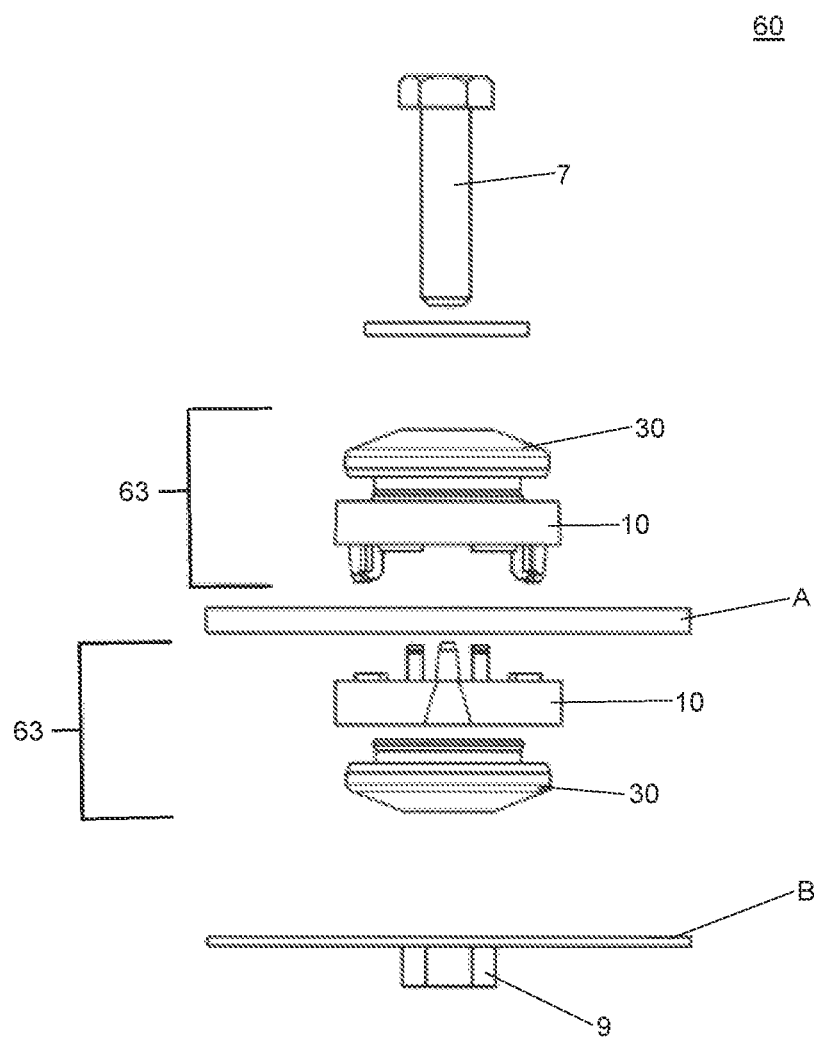

FIG. 8 shows an alternative embodiment of a fastening arrangement 60. The fastening arrangement 60 essentially corresponds to the above-described fastening arrangement 1, however, no sleeve 50 is provided. A sufficient stability of the respective fastening unit 63 is achieved by choosing the suitable material for the damping element 30. For this purpose, the damping element 30 may be made of a thermoplastic elastomer. With regard to the functionality and the construction, reference is made to the explanations as regards to the fastening arrangement 1.

Figure 9:
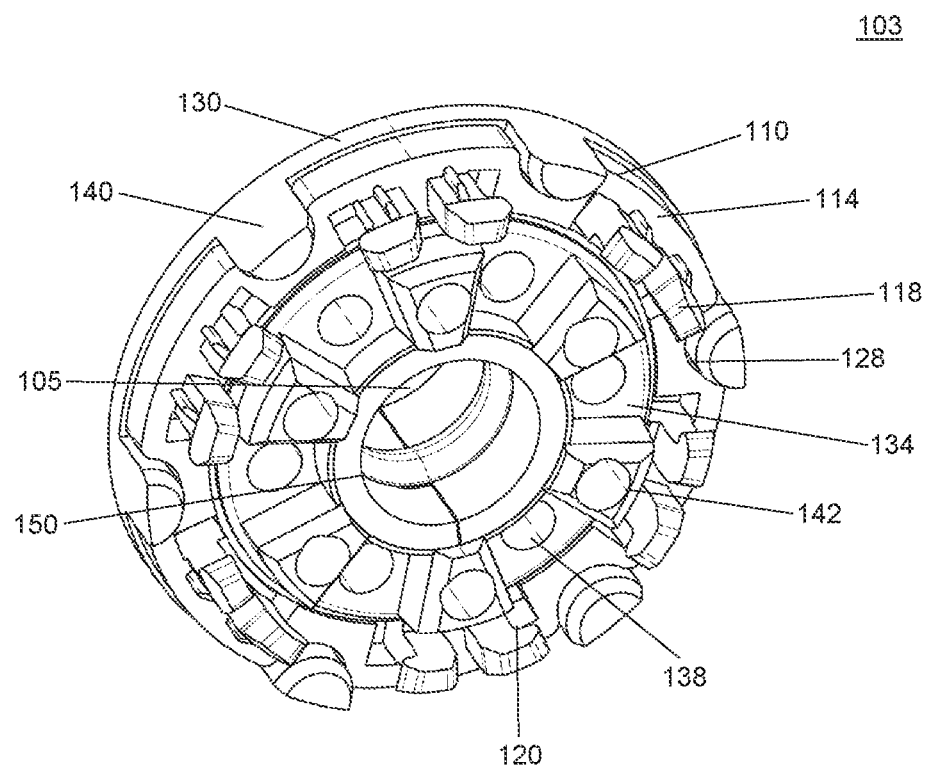
Figure 10:
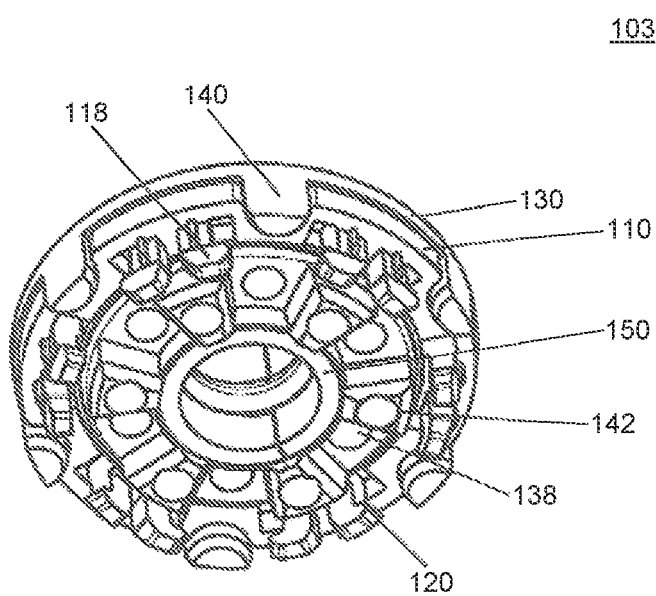

With reference to FIGS. 9 and 10, an alternative second embodiment of the fastening unit 103 is now discussed. In this context, the differences to the first embodiment according to FIGS. 1 to 4 are mainly explained. In contrast to the first embodiment, the latching noses 118 of the one assembly element 110 provide latching surfaces 120 for the other assembly element 110 in the alternative second embodiment.

For this purpose, the latching noses 118 of the assembly element 110 are arranged on a common circle line. Adjacent latching noses 118 show in opposite directions along the circle line. In other words, the latching noses 118 are arranged so that the latching projections do not show radially to the outside or inside. Rather, two latching noses 118 facing each other with the back, i.e., with the side that is opposite to the latching projection, form a pair of latching noses 118. In the illustrated example, six such latching nose pairs are present, which are spaced from each other evenly. Due to this construction, the latching noses 118 of the one assembly element 110 thus form the latching surfaces 120 for the latching noses 118 of the other assembly 110 at the same time. With respect to the example with the six latching nose pairs, the two assembly elements 110 must be rotated relatively to each other by 30° around the longitudinal axis of the fastening arrangement for the assembly of the fastening element 110. Thus, the latching nose 118 of a latching nose pair of one assembly element 110 engages with a latching nose 118 of a latching nose pair of the other assembly element 110. The other latching nose of the latching nose pair 118 of the assembly element 110 engages with a latching nose 118 of an adjacent latching nose pair of the other assembly element 110. This arrangement may provide a reliable fastening of the assembly elements 110 to one another.

As an orientation aid when assembling two identically constructed fastening units 103 to form a fastening arrangement 101, each assembly element 110 has a recess 128 between each group of latching noses 118 at the radial outside, in which recess 128 a first projection 140 of the damping element is arranged. Furthermore, each clamping element 130 includes, beside the recesses 138 that are circularly formed here, a plurality of second projections 142 on the first side radially inwardly in accordance with a group of latching noses 118. This construction provides a further anti-twist protection of the fastening units 3 with respect to each other and facilitate the correct assembly.

As can also be seen, the sleeve 150 is configured with a plurality of breakthroughs, through which the material of the damping element 130 extends to the radial inside. Thus, the inner diameter of the fastening unit is reduced at this location, whereby an anti-loss protection for the fastening element can be provided.

Figure 11:
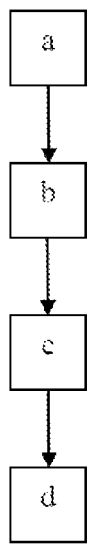

With respect to FIG. 11, a schematic course of procedure of a production method of a fastening arrangement 60 is illustrated. Here, in a first step a, an assembly element 10; 110 and in a second step b a damping element 30; 130 is provided. An arranging of the damping element 30; 130 at least partly in the assembly element 10; 110 is made in step c. These steps can take place in any order, which is explained in the following.

The providing of the assembly element 10; 110 in step a can take place by means of injection-molding the assembly element 10; 110. The same applies to the providing of the damping element 30; 130 in step b. Alternatively, the damping element 30; 130 can also be produced by means of vulcanization. Principally, different production methods are possible. On the one hand, the assembly element 10; 110 and the damping element 30; 130 can be provided separately from one another and then be inserted into one another in step c.

Alternatively, firstly, the assembly element 10; 110 is produced by means of injection molding. Then, the assembly element 10; 110 is arranged in a further injection mold and the damping element 30; 130 is produced by means of injection molding. In this way, the damping element 30; 130 is produced directly at the correct position in the assembly element 10; 110 by means of injection molding so that the separate arranging of the damping element 30; 130 in the assembly element 10; 110 becomes obsolete. This simplifies the production method further.

The above steps are repeated in step d in order to provide a further, identically constructed fastening unit 63. This means that the steps of providing a sleeve 50; 150, of providing an assembly element 10; 110, of providing a damping element 30; 130 and of arranging the damping element 30; 130 at least partly in the assembly element 10; 110 are repeated in order to provide a further, identically constructed fastening unit 63. Thus, the assembly elements 10; 110 have an identical latching structure and two identically constructed fastening units 63 of the fastening arrangement 60 are fastenable at each other by means of arranging the first sides 14; 114 of the respective assembly elements 10; 110 so that they face one another, with a first component A being arranged between them, as is explained above.

Figure 12:

Optionally, and with reference to FIG. 12, a production method of the fastening arrangement 1, i.e., the fastening arrangement with a fastening unit 3; 103 with sleeve 50; 150 is explained. This method differs from the above-described method only in that in a step e, the providing of the sleeve 50; 150 as well as the arranging of the sleeve 50; 150 in the damping element 30; 130 takes place. Provided that the sleeve 50; 150 is intended to be made of a thermoplastic, it can also be made by means of injection-molding. The sleeve 50; 150 may be inserted separately into the damping element 30; 130 or be overmolded by it during the injection-molding of the damping element 30; 130.

This offers a further alternative of proceeding of the production method. For example, firstly, the assembly element 10; 110 is produced by means of injection-molding. Then, the assembly element 10; 110 and the sleeve 50; 150 are arranged in a further injection mold and the damping element 30; 130 is made by means of injection-molding. In this way, the production method is simplified further.

Figure 13:
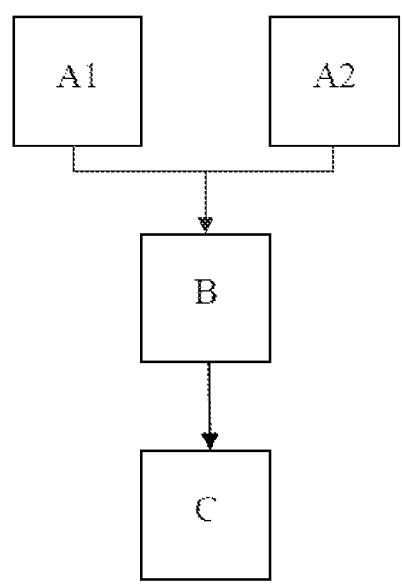

Finally, and with respect to FIG. 13, an embodiment of a connecting method of a first component A with a second component B is explained. At this, a first component A with fastening arrangement 1 arranged in there is provided in a step A1. In an alternative first step A2, a providing of a first component A and a fastening arrangement 1 as well as an arranging of the fastening arrangement 1 in an opening of the first component A takes place. In the subsequent second step B, a second component B is arranged with a second component opening in alignment with the first component opening. Finally, the connecting element is inserted in step C, so that the connecting element engages with a fastening portion 9 in or adjacent to the second component B.

The invention claimed is:

1. A fastening arrangement with damping effect consisting of two identically constructed fastening units with a central first thru-opening each, and each fastening unit includes:
   a. an assembly element as well as a damping element, and
   b. the assembly element is formed disk-like with a central second thru-opening and an identical latching structure extends from a first side of each assembly element,
   c. the damping element is formed disk-like with a central third thru-opening and is arranged at least partly in the central second thru-opening of the assembly element, so that
   d. the two fastening units are fastenable at each other via the first sides, facing each other, with the identical latching structure of the respective assembly elements with first component being interposed.

2. The fastening arrangement according to claim 1, the latching structure of which extends rectangularly with respect to the abutment surface, that is defined by the disc form of the assembly element, at the first component.

3. The fastening arrangement according to claim 1, in which each fastening unit furthermore includes a sleeve which is arranged in the central third thru-opening of the damping element.

4. The fastening arrangement according to claim 3, in which the sleeve is arranged by means of a press-fit in the central third thru-opening of the damping element.

5. The fastening arrangement according to claim 1, wherein each damping element has a shore A hardness between 40 and 80 shore A and/or a plurality of recesses on a first side, wherein the latching structure of the assembly element and the recesses of the associated damping element are provided on the same side of the respective fastening unit.

6. The fastening arrangement according to claim 1, wherein each assembly element includes a plurality of latching noses as latching structure, which engage with a corresponding plurality of latching surfaces at the assembly element in the assembled state of the fastening arrangement.

7. The fastening arrangement according to claim 1, wherein the latching noses are oriented to the radial outside.

8. The fastening arrangement according to claim 7, wherein each assembly element includes two guiding webs and two recesses on the radial inside, each being arranged radially opposite to one another and in alternation.

9. The fastening arrangement according to claim 7, wherein each assembly element includes two depressions on the radial outside.

10. The fastening arrangement according to claim 7, in which the assembly elements of each fastening unit are rotated relative to each other by 90° around the longitudinal axis for the purpose of being fastened at each other.

11. The fastening arrangement according to claim 1, wherein the latching noses of each assembly element are arranged on a joint circle line and adjacent latching noses show in opposite directions along the circle line.

12. The fastening arrangement according to claim 11, wherein each assembly element includes a recess between each group of latching noses at the radial outside, in which a corresponding first projection of the damping element is arranged.

13. The fastening arrangement according to claim 11, wherein each damping element includes a plurality of second projections in accordance with a pair of latching noses on the first side radially inwardly.

14. The fastening arrangement according to claim 11, in which the sleeve of each fastening unit is configured two-part or with a plurality of breakthroughs.

15. The fastening arrangement according to claim 11, in which the assembly elements of each fastening unit are rotated with respect to each other by 30° around the longitudinal axis for the purpose of being fastened at each other.

16. A first component with a fastening arrangement according to claim 1 that is arranged in a component opening of the first component.

17. A component connection including a first component according to claim 16 as well as a second component with a second opening and a connecting element, wherein the connecting element extends through the fastening arrangement and engages with a suitable fastening portion in or adjacent to the second component.

18. The component connection according to claim 17, wherein a radial tolerance compensation is implementable in that each damping element has an inner diameter that is larger than the outer diameter of the connecting element.

* * * * *